(12) United States Patent  
Kim et al.

(10) Patent No.: US 8,599,930 B2  
(45) Date of Patent: Dec. 3, 2013

(54) IMAGE CODING AND DECODING METHOD AND APPARATUS CONSIDERING HUMAN VISUAL CHARACTERISTICS

(75) Inventors: Woo-shik Kim, Kyungki-do (KR); Dae-sung Cho, Seoul (KR); Shi-hwa Lee, Seoul (KR); Sang-wook Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1236 days.

(21) Appl. No.: 11/304,701

(22) Filed: Dec. 16, 2005

(65) Prior Publication Data

US 2006/0093035 A1  May 4, 2006

Related U.S. Application Data

(62) Division of application No. 10/336,779, filed on Jan. 6, 2003, now Pat. No. 7,277,484.

(30) Foreign Application Priority Data

Jan. 5, 2002 (KR) .................................. 2002-602  
Aug. 30, 2002 (KR) ............................. 2002-51883

(51) Int. Cl.  
*H04N 7/18* (2006.01)

(52) U.S. Cl.  
USPC .................................................... 375/240.26

(58) Field of Classification Search  
USPC ........................................ 375/240.01–240.29  
See application file for complete search history.

(56) References Cited

U.S. PATENT DOCUMENTS

| | | | |
|---|---|---|---|
| 5,557,332 A * | 9/1996 | Koyanagi et al. | 375/240.16 |
| 5,614,952 A | 3/1997 | Boyce et al. | |
| 5,764,803 A | 6/1998 | Jacquin et al. | |
| 5,812,787 A | 9/1998 | Astle | |
| 5,815,209 A * | 9/1998 | Kondo et al. | 375/240.18 |
| 5,815,601 A | 9/1998 | Katata et al. | |
| 5,847,771 A | 12/1998 | Cloutier et al. | |
| 5,867,208 A | 2/1999 | McLaren | |
| 5,920,359 A | 7/1999 | Curley | |
| 6,178,204 B1 | 1/2001 | Hazra | |

(Continued)

FOREIGN PATENT DOCUMENTS

| | | |
|---|---|---|
| CN | 1280744 | 1/2001 |
| EP | 0731608 | 9/1996 |

(Continued)

OTHER PUBLICATIONS

Korean Office Action dated Apr. 25, 2006 for corresponding application 10-1999-0040210.

(Continued)

*Primary Examiner* — Andy Rao  
(74) *Attorney, Agent, or Firm* — Staas & Halsey LLP

(57) ABSTRACT

An image coding method and apparatus considering human visual characteristics are provided. The image coding method comprises (a) modeling image quality distribution of an input image in units of scenes such that the quality of an image input in units of scenes is gradually lowered from a region of interest to a background region, (b) determining a quantization parameter of each region constituting one scene according to the result of modeling of image quality distribution, (c) quantizing image data in accordance with the quantization parameter, and (d) coding entropy of the quantized image data.

50 Claims, 20 Drawing Sheets

(56) References Cited

U.S. PATENT DOCUMENTS

| | | | |
|---|---|---|---|
| 6,256,423 | B1 | 7/2001 | Krishnamurthy et al. |
| 6,263,022 | B1 | 7/2001 | Chen et al. |
| 6,304,295 | B1 | 10/2001 | Krishnamurthy et al. |
| 6,493,023 | B1 | 12/2002 | Watson |
| 6,507,618 | B1 * | 1/2003 | Wee et al. ............... 375/240.16 |
| 6,570,922 | B1 | 5/2003 | Wang et al. |
| 6,640,012 | B1 | 10/2003 | Shnaider et al. |
| 6,754,270 | B1 | 6/2004 | Golin et al. |
| 6,909,810 | B2 | 6/2005 | Maeda |
| 6,937,773 | B1 | 8/2005 | Nozawa |
| 7,286,710 | B2 * | 10/2007 | Marpe et al. ................ 382/239 |
| 7,386,049 | B2 * | 6/2008 | Garrido et al. .......... 375/240.15 |
| 2002/0005909 | A1 | 1/2002 | Sato |
| 2003/0095598 | A1 | 5/2003 | Lee et al. |
| 2003/0095599 | A1 | 5/2003 | Lee et al. |

FOREIGN PATENT DOCUMENTS

| | | |
|---|---|---|
| EP | 1051039 | 11/2000 |
| JP | 63-263982 | 10/1988 |
| JP | 64-029074 | 1/1989 |
| JP | 2-119464 A | 5/1990 |
| KR | 2000-23278 | 4/2000 |
| KR | 10-2001-0019448 | 3/2001 |

OTHER PUBLICATIONS

Search Report for subject matter related to pending claims of U.S. Appl. No. 11/304,672, prepared on Novermber 26, 2008, referenced in above identifed references AA-AG.
U.S. Appl. No. 11/304,672, filed Dec. 16, 2005, Woo-shik Kim et al., Samsung Electronics Co., Ltd.
U.S. Appl. No. 11/304,671, filed Dec. 16, 2005, Woo-shik Kim et al., Samsung Electronics Co., Ltd.
U.S. Appl. No. 11/700,041, filed Jan. 31, 2007, Woo-shik Kim et al., Samsung Electronics Co., Ltd.
U.S. Appl. No. 11/700,141, filed Jan. 31, 2007, Woo-shik Kim et al., Samsung Electronics Co., Ltd.
U.S. Appl. No. 11/304,627, filed Dec. 16, 2005, Woo-shik Kim et al., Samsung Electronics Co., Ltd.
U.S. Appl. No. 11/700,057, filed Jan. 31, 2007, Woo-shik Kim et al., Samsung Electronics Co., Ltd.
U.S. Appl. No. 11/700,048, filed Jan. 31, 2007, Woo-shik Kim et al., Samsung Electronics Co., Ltd.
Chinese Office Action issued Apr. 4, 2008 in corresponding Chinese Patent Application No. 2006100067204.
Korean Office Action issued Apr. 26, 2004 in corresponding Korean Patent Application No. 10-2002-0000602.
Korean Office Action issued Apr. 25, 2005 in corresponding Korean Patent Application No. 10-2002-0051883.
U.S. Office Action mailed Apr. 2, 2009, in related U.S. Appl. No. 11/304,671.
U.S. Interview Summary mailed Jun. 19, 2009, in related U.S. Appl. No. 11/304,671.
U.S. Office Action mailed Nov. 4, 2009, in related U.S. Appl. No. 11/304,671.
U.S. Office Action mailed Apr. 1, 2009, in related U.S. Appl. No. 11/304,627.
U.S. Interview Summary mailed Jun. 19, 2009, in related U.S. Appl. No. 11/304,627.
U.S. Office Action mailed Nov. 4, 2009, in related U.S. Appl. No. 11/304,627.
U.S. Final Office Action mailed May 27, 2010, in related U.S. Appl. No. 11/304,671.
U.S. Final Office Action mailed May 27, 2010, in related U.S. Appl. No. 11/304,627.
Japanese Office Action dated Feb. 1, 2006 for corresponding application 2003-000403.
Korean Office Action dated Apr. 25, 2005 for corresponding application 10-1999-0040210.
Korean Office Action dated Apr. 26, 2005 for corresponding application 10-2002-0051883.
U.S. Office Action mailed Apr. 1, 2009, in related U.S. Appl. No. 11/304,672.
U.S. Interview Summary mailed Jun. 25, 2009, in related U.S. Appl. No. 11/304,672.
U.S. Final Office Action mailed May 11, 2010 in related U.S. Appl. No. 11/304,627.
U.S. Office Action mailed Oct. 3, 2011 in co-pending U.S. Appl. No. 11/700,141.
U.S. Office Action mailed Oct. 4, 2011 in co-pending U.S. Appl. No. 11/700,048.
U.S. Final Office Action mailed Mar. 19, 2012 in co-pending U.S. Appl. No. 11/700,041.
U.S. Final Office Action mailed Mar. 22, 2012 in co-pending U.S. Appl. No. 11/700,141.
Advisory Action mailed Oct. 13, 2010 corresponds to related U.S. Appl. No. 11/304,671.
U.S. Notice of Allowance mailed Aug. 31, 2012 in related U.S. Appl. No. 11/700,048.
U.S. Notice of Allowance mailed Aug. 30, 2012 in related U.S. Appl. No. 11/700,041.
U.S. Notice of Allowance mailed Aug. 30, 2012 in related U.S. Appl. No. 11/700,141.
Final Office Action mailed Feb. 18, 2013 in related U.S. Appl. No. 12/801,040.
Chinese Office Action for corresponding Chinese Patent Application No. 200610006720.4 dated Apr. 25, 2011 (3 pgs).
Japanese Office Action dated Apr. 17, 2012 corresponds to Japanese Patent Application No. 2009-235782.
U.S. Advisory Action mailed Oct. 5, 2010, in related U.S. Appl. No. 11/304,627.
U.S. Office Action mailed Oct. 5, 2010, in related U.S. Appl. No. 11/700,057.
U.S. Office Action mailed Sep. 28, 2011 in co-pending U.S. Appl. No. 11/700,041.
Japanese Office Action dated Feb. 1, 2006.
U.S. Notice of Allowance mailed May 31, 2011 in co-pending U.S. Appl. No. 11/304,672.
U.S. Communication mailed Jul. 21, 2011 in co-pending U.S. Appl. No. 11/304,672.
U.S. Notice of Allowance mailed Jun. 23, 2011 in co-pending U.S. Appl. No. 11/700,057.
U.S. Communication mailed Jul. 6, 2011 in co-pending U.S. Appl. No. 11/700,057.

* cited by examiner

IMAGE CODING AND DECODING METHOD AND APPARATUS CONSIDERING HUMAN VISUAL CHARACTERISTICS

This application is a divisional application of Serial No. 10,336,779, filed on Jan. 6, 2003, U.S. Pat. No. 7,277,484, which claims priority of Korean Patent Application Nos. 2002-0000602, filed on Jan. 5, 2002, and 2002-0051883, filed on Aug. 30, 2002, in the Korean Intellectual Property Office, the disclosures of which are incorporated herein in their entirety by reference.

BACKGROUND OF THE INVENTION

1. Field of the Invention

The present invention relates to image coding, and more particularly, to an image coding and decoding method and apparatus considering human visual characteristics.

2. Description of the Related Art

In general, an image is compressed for storage/transmission purposes. FIG. 1 shows a flowchart illustrating a conventional image compression method, wherein, in order to generate a compressed bit stream, spatial/temporal prediction coding (100), transform coding (110), quantization (120), and entropy coding (130), are sequentially carried out. In this case, most losses are generated during the quantization operation 120. This lossy compression method includes a lossy compression method for a still image and a lossy compression method for a moving image. JPEG is a representative lossy compression method for a still image, while MPEG-1, 2, 4, and H.261 and H.263 are representative lossy compression methods for a moving image.

Meanwhile, discrete cosine transform (DCT) is carried out when an image is coded. In this case, since the amount of calculation is too large in order to perform DCT on the whole image, an image is divided into blocks of a predetermined size, i.e., 8×8, and is then coded. Also, when quantization is performed, the amount of information increases if the image is coded using a quantization parameter for each unit block, so as to make a quantization parameter for each unit block different. Thus, the same quantization parameter is used in the whole image. In MPEG-4 and H.263 systems, information is provided in order to adjust a quantization parameter by ±2 for each block of 16×16. Then, the information is used to achieve the accurate target bitrate.

When such a coder is used, the image is displayed with similar image quality on the entire scene. However, when the user looks at an image, the user considers the image quality of a region of interest (ROI) more important than the image quality of a background region. This is why there is a difference between the regions the user can see at one time. The user intends to look at the region of interest (ROI) more carefully and to overlook other detailed portions of the background region. In particular, this phenomenon remarkably appears in case of a moving image. Thus, when an image is coded with less bits, improvement of the image quality of the region of interest (ROI) is needed by allocating more bits to the region of interest (ROI) than to the background region, rather than uniformly allocating the bits to the whole image.

In the MPEG-4 and H.263 systems, a part of an image is divided into regions and coded. In the MPEG-4 system, a user can define the regions in units of pixels using shape coding beyond a core profile. The above method is mainly used in MPEG-4 because operations can be performed in units of each object constituting a scene. Each of the objects is coded using different bitstreams, and user interaction can be performed in MPEG-4 using the above structure. Using this method, the ROI and the background region are separated from each other for each object such that the image is coded with different image quality. However, this object separation process is very complicated. Even though the objects are simply separated from one another using a rough shape, information is additionally needed in showing the shape of each of the objects, and thus a compression efficiency is lowered.

Also, in the H.263 system, a part of an image can be divided into regions in units of groups of consecutive macroblocks (MBs) or in units of groups of macroblocks (MBs) in a certain rectangular shape using a slice structured mode at an annex K and the image can be coded. This method, used in the H.263 system, is robust to errors. An important portion in an environment using a multiple transmission channel is transmitted via a transmission channel in a better environment such that a transmission efficiency is improved and errors occurring in a region are prevented from spreading into another region. In this case, the ROI can be coded using a slice structure in a rectangular shape. However, in order to show the background region, a part of an image must be divided into several rectangles, and thus, the structure of the H.263 system becomes complicated.

In U.S. Pat. No. 5,764,803 entitled by "Motion-adaptive Modeling Scene Content for very low Bit Rate Model assisted Coding of Video Sequences", a part of an image is divided into a region of interest (ROI) and a background region and then, the image is coded. However, there is a limitation in the range of a quantization parameter which can be varied in each region. Thus, due to a difference in the image quality between the region of interest (ROI) and the background region, a boundary between the region of interest (ROI) and the background region can be seen.

Also, U.S. Pat. No. 6,263,022 entitled by "System and Method for fine granular scalable (FGS) Video with selective Quality Enhancement" discloses a compression method used in a multiple transmission channel environment including a base layer and an enhancement layer. The method can adapt to an environment of a transmission channel, but it is difficult to perform inter prediction, and thus a coding efficiency decreases. Also, the image quality of the region of interest (ROI) is improved, but an overall coding efficiency decreases. Thus, the image quality of the background region is greatly lowered. That is, a difference in image quality between the region of interest and the background region increases, and to this end, the boundary between the region of interest and the background region remarkably appears.

Also, U.S. Pat. No. 6,256,423 entitled by "Intra-frame quantizer Selection for Video Compression" discloses a compression method in which a region of interest (ROI) and a background region, a transition region between the region of interest (ROI) and the background region are defined and a quantization parameter between regions is determined. In the method, because of the transition region, a phenomenon by which a boundary between the region of interest (ROI) and the background region appears can be slightly prevented. However, there is a limitation in the range of the quantization parameter of each region, and n transition regions are also needed when n region of interests (ROIs) exist in a part of a region, and thus a coding method is complicated. In addition, in order to smoothen the boundary between regions, another transition region between the transition region and another region is additionally needed. As a result, it is difficult to determine a quantization parameter of each region. In order to solve this problem, a method of iteratively selecting a quantization parameter has been also used, but this method results in an increase in the amount of calculation.

SUMMARY OF THE INVENTION

The present invention provides an image coding and decoding method and apparatus, which prevent a boundary between a region of interest (ROI) and a background region from being formed in an image and the method requires a small amount of calculation by considering human visual characteristics.

The present invention further provides an image coding and decoding method and apparatus, by which coding and decoding of a region of interest (ROI) are effectively performed using a plurality of rectangular regions when an image is coded and decoded.

The present invention further provides a recording medium on which the image coding and decoding method is recorded as a program code that can be executed by a computer.

According to an aspect of the present invention, there is provided an image coding method. The image coding method comprises (a) modeling image quality distribution of an input image in units of scenes such that the quality of an image input in units of scenes is gradually lowered from a region of interest to a background region, (b) determining a quantization parameter of each region constituting one scene according to the result of modeling of image quality distribution, (c) quantizing image data in accordance with the quantization parameter, and (d) coding entropy of the quantized image data.

According to another aspect of the present invention, there is provided an image coding apparatus. The image coding apparatus includes an image quality modeling unit which models image quality distribution of an input image in units of scenes such that the quality of an image input in units of scenes is gradually lowered from a region of interest to a background region, and determines a quantization parameter of each region constituting one scene according to the result of modeling of image quality distribution, an adaptive quantizing unit which quantizes image data in accordance with the quantization parameter determined by the image quality modeling unit, and an entropy coding unit which codes entropy of the image data quantized by the adaptive quantizing unit.

According to another aspect of the present invention, there is provided an image decoding method. The image decoding method comprises (a) decoding image data including information on position and size of each region and the value of a quantization parameter in a received bitstream, (b) determining the value of a quantization parameter in each region using the information on position and size and each region and the value of a quantization parameter restored in (a) such that image quality is gradually lowered from a region of interest to a background region, (c) inverse-quantizing decoded image data using the value of the quantization parameter, and (d) adding an image restored for each region according to its corresponding position in accordance with the value of position of each region restored in (a) and constituting one scene.

According to another aspect of the present invention, there is provided an image decoding apparatus. The image decoding apparatus includes an entropy decoding unit which decodes entropy of image data including information on position and size of each region and the value of a quantization parameter in a received bitstream, an image quality modeling unit which determines the value of a quantization parameter in each region using the information on position and size and each region and the value of a quantization parameter restored by the entropy decoding unit such that image quality is gradually lowered from a region of interest to a background region, an adaptive inverse-quantizing unit which inverse-quantizes the image data provided by the entropy decoding unit according to the value of the quantization parameter for each region determined by the image quality modeling unit, and an image constituting unit which adds an image restored for each region according to its corresponding position in accordance with the value of position of each region provided by the entropy decoding unit and constitutes one scene.

According to another aspect of the present invention, there is provided an image coding apparatus. The image coding apparatus includes a slice modeling unit which divides each image into at least one of independent rectangular slices, a picture header coding unit which codes information on positions and sizes of the slices divided by the slice modeling unit to a picture header together with other information, and a slice coding unit which codes an image in units of slices by referring to the picture header information.

According to another aspect of the present invention, there is provided an image decoding apparatus. The image decoding apparatus includes a picture header decoding unit which decodes a picture header in a bitstream, a slice constituting unit which constitutes slices using information on positions and sizes of slices among the picture header information, a slice decoding unit which decodes an image in units of slices by referring to the picture header, and an image constituting unit which constitutes the image in units of slices restored by the slice decoding unit as a part of an image by referring to the information on positions and sizes of the slices obtained by the slice constituting unit.

According to another aspect of the present invention, there is provided an image coding method. The image coding method comprises (a) setting positions and sizes of slices in a part of an image, (b) coding information on positions and sizes of the slices set in (a) to a picture header together with other information, and (c) coding an image in units of slices by referring to the picture header information coded in (b).

According to another aspect of the present invention, there is provided an image decoding method. The image decoding method comprises (a) decoding a picture header in a bitstream, (b) constituting slices using information on positions and sizes of slices included the picture header decoded in (a), (c) decoding an image in units of slices by referring to the picture header decoded in (a), and (d) constituting the image in units of slices decoded in (c) as a part of an image by referring to the information on positions and sizes of the slices.

According to another aspect of the present invention, there is provided an image coding method in which an image is divided in units of slices having a predetermined size and is coded. The image coding method comprises defining information on positions and sizes of a plurality of rectangular regions in which a region of interest is included in the image and a larger rectangle includes a smaller rectangle, coding all slices included in a smallest inner rectangular region among the plurality of rectangular regions, coding slices in which outer rectangles excluding the inner rectangular region are not overlapped on smaller inner rectangles, and defining a region not included in an outermost outer rectangular region as a background region and coding slices included in the background region.

According to another aspect of the present invention, there is provided an image decoding method in which an image is divided in units of slices having a predetermined size and is coded, the image is divided into a background region and a region of interest, and the image is decoded in a bitstream defined by a plurality of rectangular regions in which a region of interest is included in the image and a larger rectangle includes a smaller rectangle. The image decoding method comprises extracting information on each position and size of the plurality of rectangular regions including the region of interest from the bitstream, decoding all slices included in a smallest inner rectangular region among the plurality of rectangular regions, decoding only slices in which outer rectangles excluding the inner rectangular region are not overlapped on smaller inner rectangles, and decoding all slices in the background region not included in the plurality of rectangular regions.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Hereinafter, an image coding and decoding method and apparatus considering human visual characteristics according to the present invention will be described in detail with reference to the accompanying drawings.

Figure 1:
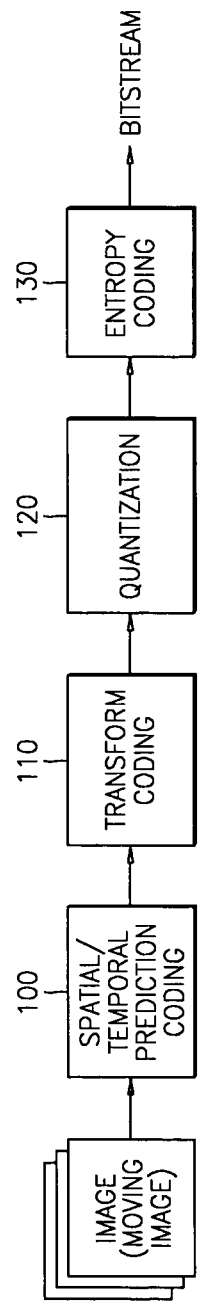
FIG. 1 shows a flowchart illustrating a conventional image compression method.
Figure 2:
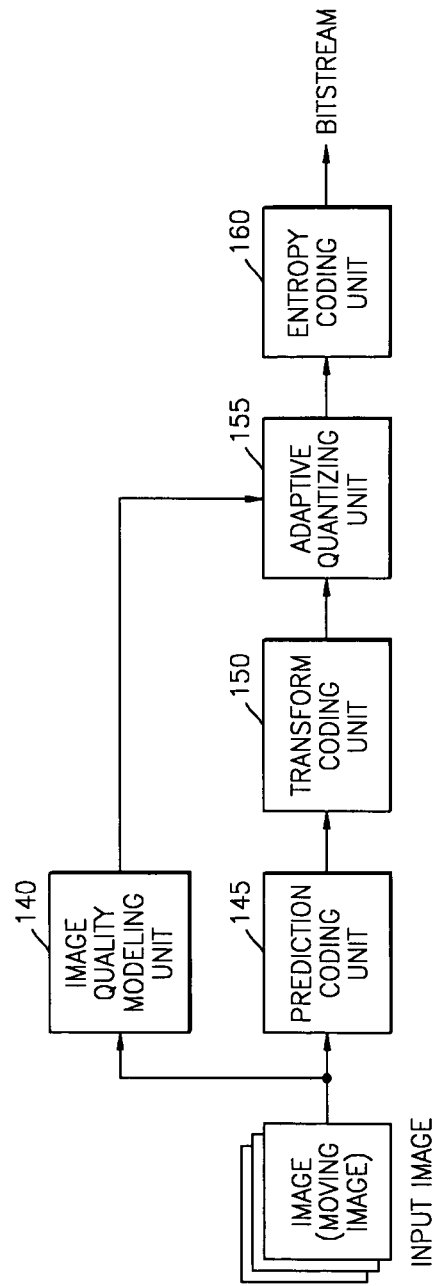
FIG. 2 shows a block diagram schematically illustrating an image coding apparatus considering human visual characteristics according to an embodiment of the present invention.

FIG. 2 shows a block diagram schematically illustrating an image coding apparatus considering human visual characteristics according to an embodiment of the present invention. Referring to FIG. 2, the image coding apparatus includes an image quality modeling unit 140, a prediction coding unit 145, a transform coding unit 150, an adaptive quantizing unit 155, and an entropy coding unit 160.

The image quality modeling unit 140 models image quality distribution of an input image in units of scenes such that the image quality of an image input in units of scenes is gradually lowered from a region of interest (ROI) to a background region. Also, the image quality modeling unit 140 determines a quantization parameter of each of regions constituting one scene in accordance with the result of modeling of image quality distribution.

The predication coding unit 145 prediction-codes the input image, and the transform coding unit 150 transform-codes the prediction-coded input image. In this case, in order to simplify coding calculation, the predication coding unit 145 and the transform coding unit 150 perform coding in units of blocks having a predetermined size.

The adaptive quantizing unit 155 quantizes image data for each MB in accordance with the quantization parameter determined by the image quality modeling unit 140.

The entropy coding unit 160 codes entropy of the image data quantized by the adaptive quantizing unit 155.

Figure 3:
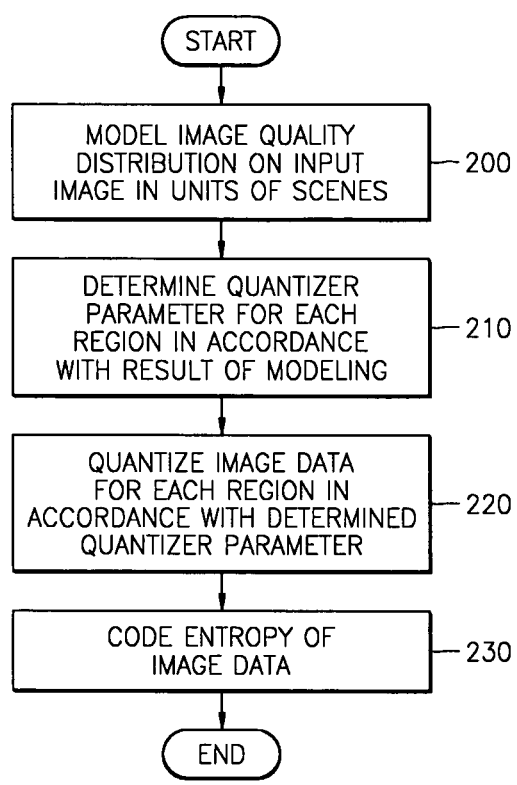
FIG. 3 shows a flowchart illustrating an image coding method performed in the image coding apparatus of FIG. 2, according to an embodiment of the present invention.

FIG. 3 shows a flowchart illustrating an image coding method performed in the image coding apparatus of FIG. 2, according to an embodiment of the present invention.

Now, the operation of the image coding apparatus of FIG. 2 will be described with reference to FIGS. 2 and 3.

First, in step 200, the image quality modeling unit 140 models image quality distribution on an input image in units of scenes such that the image quality of an image input in units of scenes is gradually lowered from a region of interest (ROI) to a background region. After step 200, in step 210, the image quality modeling unit 140 determines a quantization parameter of each of blocks having a predetermined size, i.e., 8 (pixel)×8 or 16×16, constituting one scene in accordance with the result of modeling of the image quality distribution and provides the determined quantization parameter to the adaptive quantizing unit 155.

Figure 4A:
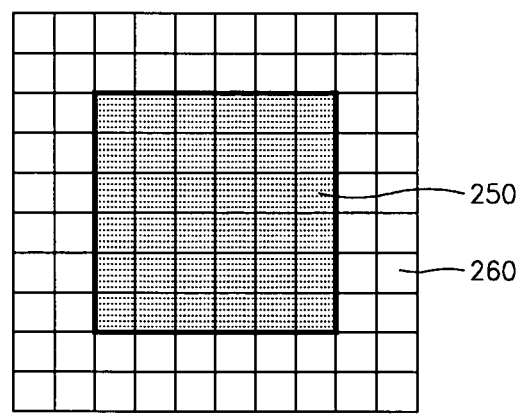
FIGS. 4A and 4B show a step of determining a region of interest (ROI), an interpolation region, and a background region in one scene.
Figure 4B:
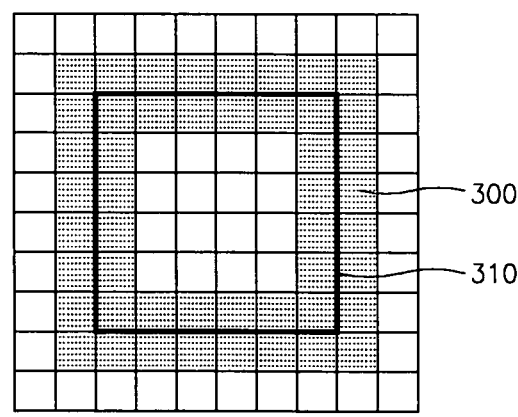

Since the image quality modeling unit 140 models image quality such that the image quality of the input image is gradually lowered from a center of the region of interest (ROI) to the background region, the quantization parameter is small in the region of interest (ROI) and gradually increases toward the background region. The quantization parameter is determined by a bit target. Here, the image quality modeling unit 140 can model the image quality so that image quality distribution has gaussian distribution. Alternatively, the image quality modeling unit 140 can set a predetermined interpolation region between the region of interest (ROI) and the background region for each scene and can model the image quality distribution such that the highest image quality is obtained in the center of the region of interest (ROI) and image quality for each region is lowered in the background region, but a difference in the background region is not remarkable in the interpolation region. For example, the image quality modeling unit 140 can determine a region of interest (ROI) 250 and a background region 260 in one scene, as shown in FIG. 4A, and set an interpolation region 300 for removing a blocking phenomenon caused by a difference in image quality between regions in a region in which each of the regions is connected to each other, as shown in FIG. 4B. The image quality modeling unit 140 determines a quantization parameter by modeling image quality such that image quality is naturally connected in the interpolation region. A quantization parameter in the interpolation region can be varied linearly or nonlinearly. Modeling of image quality will be described in detail with reference to FIGS. 5 and 6.

After step 210, in step 220, the adaptive quantizing unit 155 inputs prediction-coded and transform-coded image data for each region, and the image quality modeling unit 140 quantizes the image data for each region in accordance with the quantization parameter determined by the image quality modeling unit 140. Meanwhile, the quantization parameter provided by the image quality modeling unit 140 increases from the region of interest (ROI) to the background region of a scene, and thus the degree of losses caused by quantization is different. That is, the least loss is in the center of the region of interest (ROI) at which the human eyes are most focused, and losses increase toward the background region at which the human eyes are relatively least focused.

After step 220, in step 230, the entropy coding unit 160 codes entropy of the image data quantized by the adaptive quantizing unit 155 and outputs the coded entropy of the image data as a bitstream.

As above, the quantization parameter gradually increases from the region of interest (ROI) to the background region through predetermined image-quality modeling considering human visual characteristics, thereby effectively removing the blocking phenomenon between regions while improving a coding efficiency.

Figure 5A:
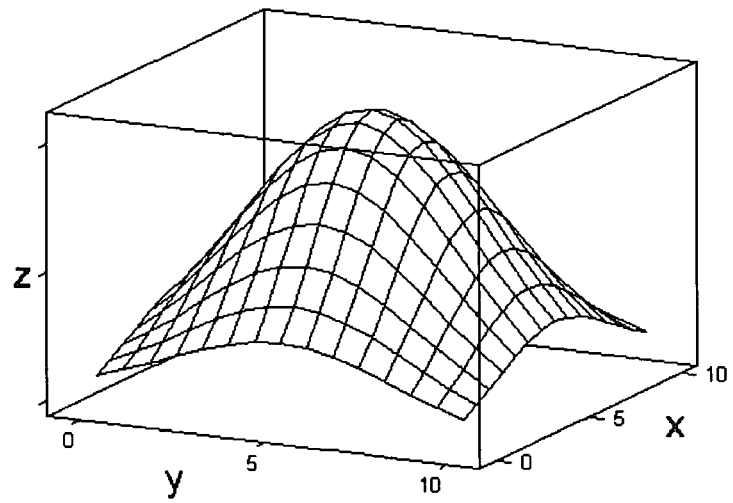
FIGS. 5A through 5C show graphs comparing the distribution of image quality of the prior art with distribution of image quality of the present invention.
Figure 5B:
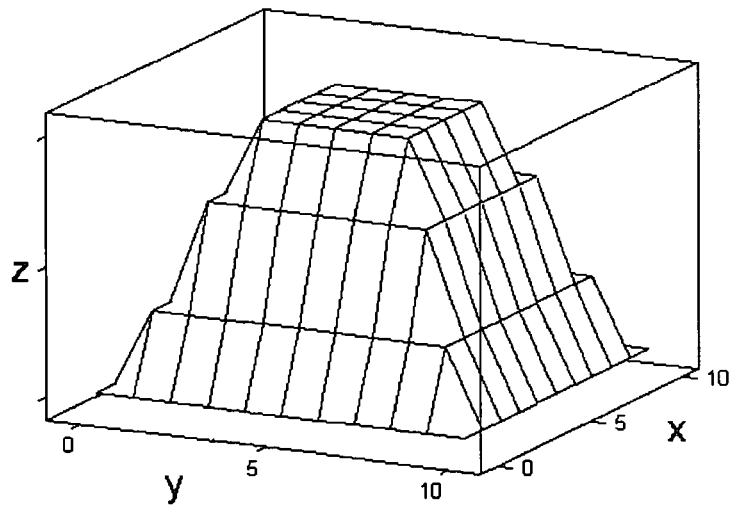
Figure 5C:
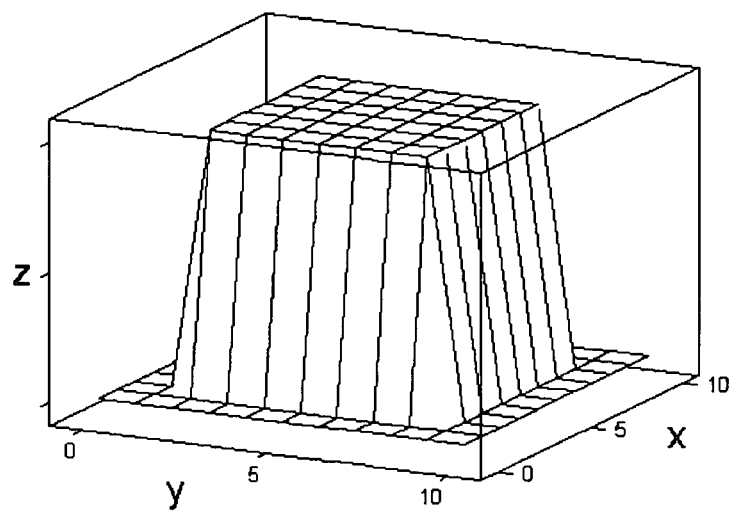

FIGS. 5A through 5C show graphs comparing the distribution of image quality of the prior art with distribution of image quality of the present invention. In FIGS. 5A through 5C, an x-axis and a y-axis indicate a spatial domain of each image, respectively, and a z-axis indicates image quality. And, a region of interest (ROI) of an image is assumed to be a middle portion of a scene.

FIG. 5A shows image quality distribution illustrating a case where the image quality modeling unit 140 models image quality distribution in one scene to have gaussian distribution centered on the region of interest (ROI). Referring to FIG. 5A, image quality distribution has two-dimensional gaussian distribution averaged on the center of an image, in which the highest image quality is obtained in the region of interest (ROI) and image quality is gradually lowered in the background region. In this case, the slope of variations in image quality can be adjusted in accordance with dispersion values of the x- and y-axes. The image quality distribution can be formed differently in accordance with the number of regions of interest (ROI). In addition, in this case, quantization parameter distribution caused by image quality distribution is modeled in one scene and a model thereof is transmitted, instead of coding a quantization parameter for each unit block and transmitting the quantization parameter. For example, if the position and dispersion value of the unit block corresponding to the center of the region of interest (ROI) are transmitted, the quantization parameter of all unit blocks can be calculated automatically at a recipient.

FIG. 5B shows a case where the interpolation region is placed between the region of interest (ROI) and the background region, so as to reduce a rapid difference in image quality. In this case, one quantization parameter is assigned to each region. An interval at which a quantization parameter is to be varied, is set in accordance with the size of a region. Additional information does not need to be inserted in the interval by setting the same rules in a coder and a decoder. For example, in the case of a rectangular region, if a region corresponding to 20% of each of width and length is set to an interval at which the quantization parameter is to be varied, the varied quantization parameter can be applied to the region of a block corresponding to 20% from the outside of each region and can be coded.

Even when decoding the quantization parameter, the varied quantization parameter is applied to a portion corresponding to 20%, and thus the varied quantization parameter can be correctly coded. And, by using the same quantization method in the coder and the decoder, the quantization parameter can be varied in according to preset rules without inserting additional information on a method for varying the quantization parameter.

FIG. 5C shows image quality distribution illustrating a case where one scene is divided into a region of interest (ROI) and a background region in the prior art. In this case, due to a difference in image quality between two regions, a blocking phenomenon that a boundary between the two regions appears, occurs and thus image quality is damaged.

Finally, referring to FIGS. 5A and 5B, image quality is gradually lowered from the region of interest (ROI) to the background region, and thus a user cannot sense a difference in image quality between the region of interest (ROI) and the background region. However, due to a rapid difference in image quality between the region of interest (ROI) and the background region, as shown in FIG. 5C, the user senses the blocking phenomenon.

Figure 6A:
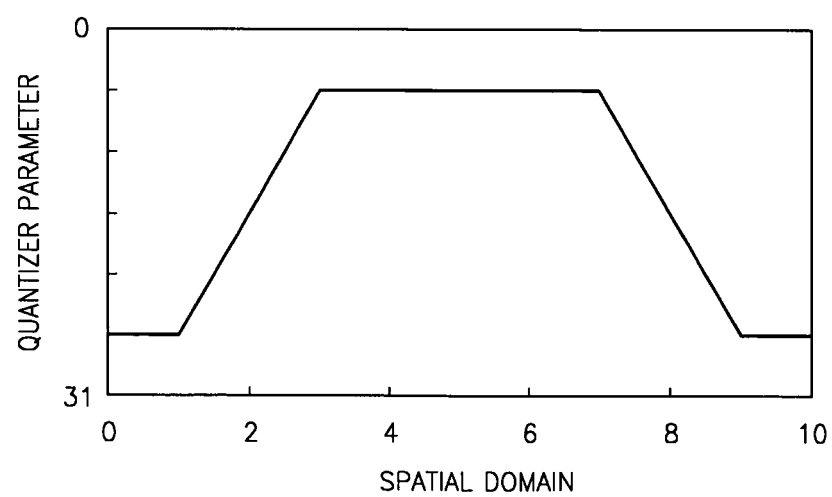
FIGS. 6A through 6C show the characteristics of a quantization parameter determined by an image quality modeling unit of FIG. 2.
Figure 6B:
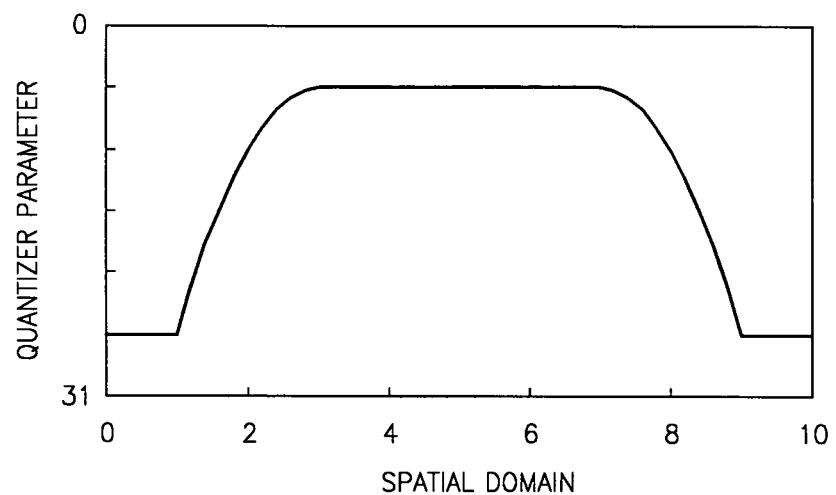
Figure 6C:
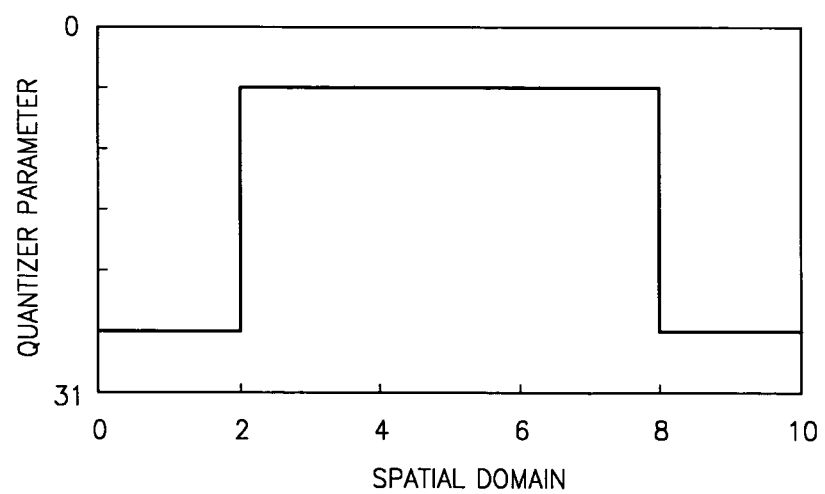

FIGS. 6A through 6C show the characteristics of a quantization parameter determined by the image quality modeling unit 140 of FIG. 2. For convenience, assuming that 0-2 and 8-10 of a spatial domain are set to the background region, 2-8 of the spatial domain is set to the region of interest (ROI), and the quantization parameter is varied from 0 to 31.

FIG. 6A shows a case where the quantization parameter is linearly varied in the interpolation region of FIG. 4B or 5B, and FIG. 6B shows a case where the quantization parameter is nonlinearly varied in the interpolation region of FIG. 4B or 5B. Referring to FIGS. 6A and 6B, the quantization parameter is determined such that a difference in image quality between the region of interest (ROI) and the background region is not rapidly varied but is gradually varied in the interpolation region between the region of interest (ROI) and the background region. FIG. 6C shows the characteristics of the quantization parameter when one scene is divided into the region of interest (ROI) and the background region without a conventional interpolation region, and in FIG. 6C, a difference in the quantization parameter between the region of interest (ROI) and the background region is rapid. As such, the blocking phenomenon may occur at the boundary between the region of interest (ROI) and the background region.

Meanwhile, the linear/nonlinear characteristics of the quantization parameter can be determined by the characteristics of a quantization method, as shown in FIGS. 6A and 6B. That is, whether the number of bits and image quality are varied linearly or nonlinearly, is determined in accordance with variations in the quantization parameter.

Figure 7A:
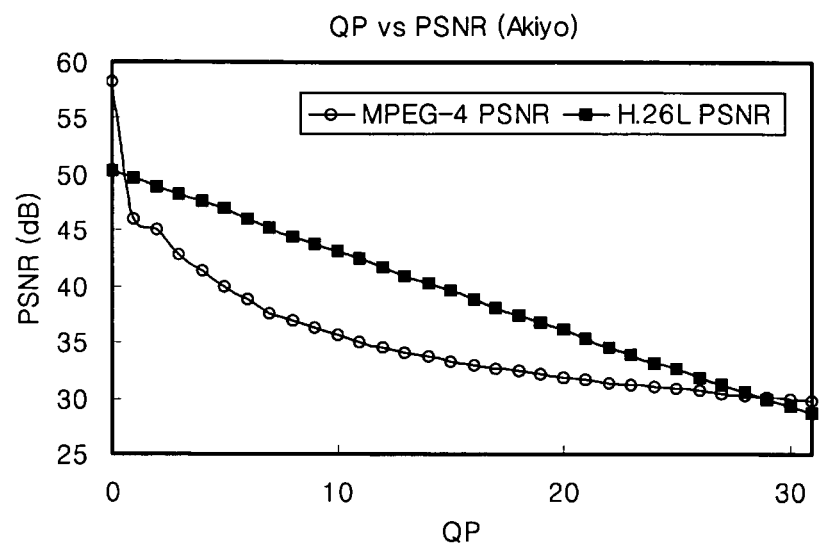
FIGS. 7A and 7B show the number of bits versus image quality in accordance with variations of a quantization parameter in a linear or nonlinear quantization method.
Figure 7B:
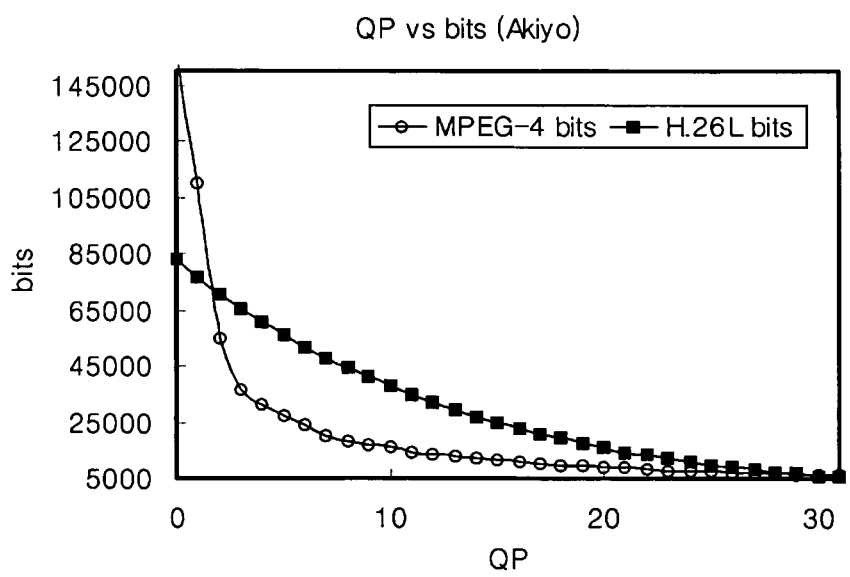

FIGS. 7A and 7B show the number of bits versus image quality in accordance with variations of a quantization parameter in a linear or nonlinear quantization method, and MPEG-4 and H.26L coders are used in FIGS. 7A and 7B.

FIG. 7A shows variations in image quality in accordance with variations of a quantization parameter and shows that the MPEG-4 coder has nonlinear characteristics and the H.26L coder has linear characteristics. In addition, FIG. 7B shows variations in the number of bits according to variations of the quantization parameter and shows that the MPEG4 coder has nonlinear characteristics and the H.26L coder has linear characteristics. That is, a method for varying the quantization parameter linearly or nonlinearly is determined by a quantization method, and thus transmission of additional information is not needed. Also, the number of bits is reduced in the region of interest (ROI), and the number of bits is increased toward the background region. Thus, the entire number of bits is not largely varied and additional calculation is not needed.

Figure 8A:
FIGS. 8A through 8C show comparison of a case where an image coding method according to the present invention is applied to an actual image, with a case where a conventional coding method is applied to an actual image.
Figure 8B:
Figure 8C:

FIGS. 8A through 8C show comparison of a case where a coding method according to the present invention is applied to an actual image, with a case where a conventional coding method is applied to an actual image. FIG. 8A shows a case where the adaptive quantization method according to the present invention is applied, and FIG. 8B shows a case where a rectangular region of interest (ROI) is formed in a middle portion of an image, the region of a scene is divided into two regions, and different quantization parameters are coded in each region. Also, FIG. 8C shows a case where the same quantization parameter is coded in all blocks of a scene without dividing the region of interest (ROI).

Referring to FIGS. 8A through 8C, the subjective image quality of an image can be improved using coding using the region of interest (ROI), as shown in FIG. 8B, rather than using the same quantization parameter in all blocks, as shown in FIG. 8C. However, a boundary between the ROI and the background region is formed. Due to this boundary phenomenon, there is a limitation in making a difference in image quality between the ROI and the background region such that there is a limitation in an efficiency of coding the ROI. However, in the case of the adaptive coding method as shown in FIG. 8A, an interpolation region is set between the ROI and the background region, and image quality is gradually varied in the interpolation region such that a difference in image quality between two interpolation regions does not appear remarkably.

Figure 9:
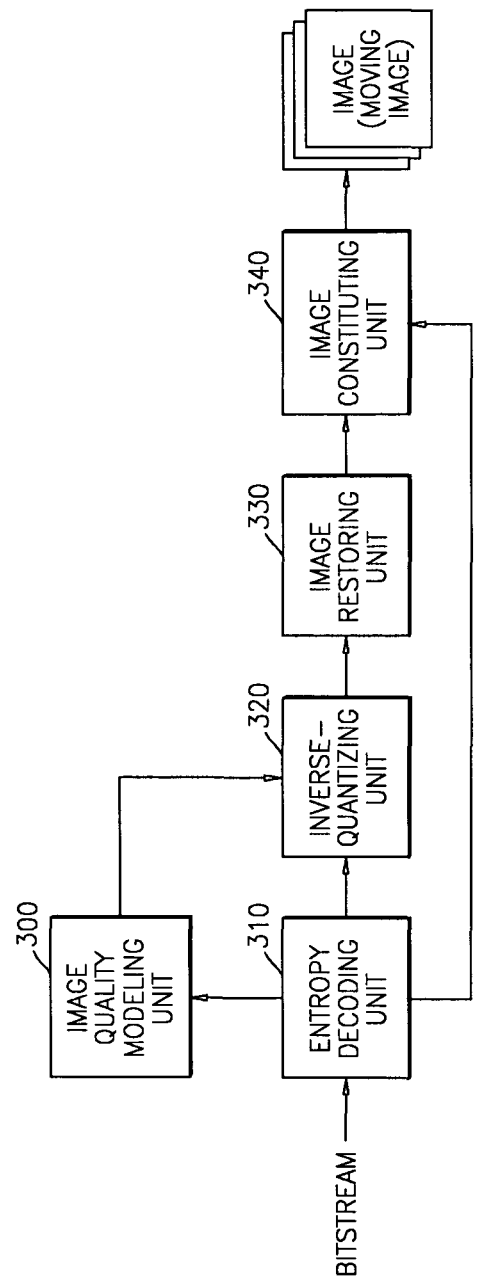
FIG. 9 shows a block diagram schematically illustrating an image decoding apparatus considering human visual characteristics according to an embodiment of the present invention.

FIG. 9 shows a block diagram schematically illustrating an image decoding apparatus considering human visual characteristics according to an embodiment of the present invention. Referring to FIG. 9, the image decoding apparatus includes an image quality modeling unit 300, an entropy decoding unit 310, an adaptive inverse-quantizing unit 320, an image restoring unit 330, and an image constituting unit 340.

Figure 10:
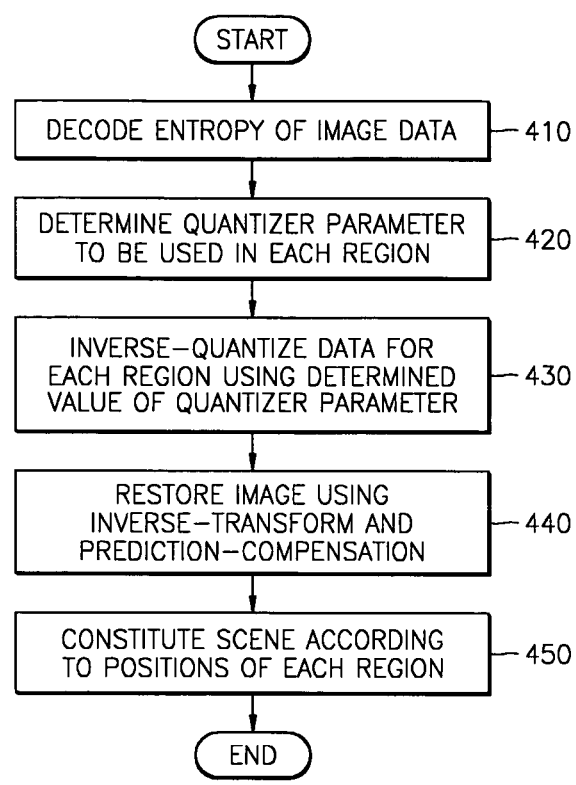
FIG. 10 shows a flowchart illustrating an image decoding method performed in the image decoding apparatus of FIG. 8, according to an embodiment of the present invention.

FIG. 10 shows a flowchart illustrating an image decoding method performed in the image decoding apparatus of FIG. 8, according to an embodiment of the present invention. Referring to FIGS. 9 and 10, the entropy decoding unit 310 receives a bitstream and decodes the bitstream of data belonging to each of regions. In step 410, image data including information on positions of each of the regions, the value of a quantization parameter, and the sizes of each of the region are decoded in the bitstream.

In step 420, the image quality modeling unit 300 determines the value of a quantization parameter of a corresponding region using the information on positions and sizes of each of the regions and the value of a quantization parameter of the data decoded by the entropy decoding unit 310. The image quality modeling unit 300 provides the value of the quantization parameter to the adaptive quantizing unit 320. In this case, the value of the quantization parameter may be set to be gradually varied at a predetermined interval so that the value of the quantization parameter between each of the regions is not rapidly varied. As described above with reference to FIGS. 5A through 5C and 6A through 6C, image quality distribution may be modeled to have gaussian distribution centered on a region of interest (ROI), or an interpolation region may be placed between the ROI and a background region so as to reduced a rapid difference in image quality. In this way, setting an interval wherein the value of quantization parameter for each region determined by the image quality modeling unit 300 is to be varied, or varying a quantization parameter is performed as in the above-mentioned coding method.

In step 430, the adaptive inverse-quantizing unit 320 inverse-quantizes data for each block transmitted by the entropy decoding unit 310 using the value of the quantization parameter determined by the image quality modeling unit 300.

In step 440, the image restoring unit 330 performs inverse-transform on each block having a predetermined size, compensates predicted information, and restores an image.

In step 450, the image constituting unit 340 constitutes one scene by adding the restored image for each region according to its corresponding position in accordance with the information on positions of each of the regions provided by the entropy decoding unit 310, to a part of an image.

The structure and operation of the adaptive image decoding apparatus according to the present invention described above are used to decode an image coded by the adaptive image coding apparatus of FIG. 2. The operation is performed in a reverse order to that the adaptive image coding apparatus, and setting an interval wherein the value of a quantization parameter for each block is to be varied, or varying a quanitzer parameter performed in the adaptive image decoding apparatus is performed as in the coding method. Thus, for convenience, these operations will not be repeated here.

Figure 11:
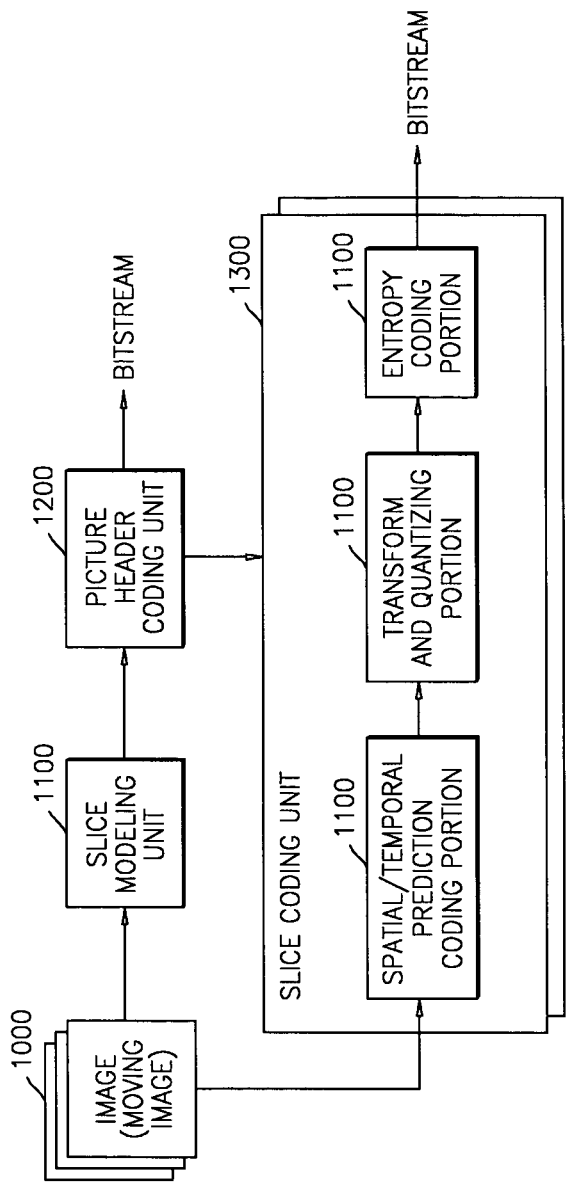
FIG. 11 shows a block diagram of an image coding apparatus according to an embodiment of the present invention.

FIG. 11 shows a block diagram of an image coding apparatus according to another embodiment of the present invention. Referring to FIG. 11, the image coding apparatus according to the present invention includes a slice modeling unit 1100, a picture header coding unit 1200, and a slice coding unit 1300. The slice coding unit 1300 includes a spatial/temporal prediction coding portion 1310, a transform and quantizing portion 1320, and an entropy coding portion 1330.

The slice modeling unit 1100 divides an image 1000 into at least one of independent slices so as to independently code an arbitrary region desired by a user. That is, the slice modeling unit 1100 may define the ROI as a rectangular region and may constitute the ROI and a region outside the ROI of a plurality of independent slices. In addition, in a part of the image 1000, the slice modeling unit 1100 may constitute a region so that a large rectangular region is overlapped on a small rectangular region using several rectangular regions and may constitute a small rectangular region and a large rectangular region that is not overlapped on the small rectangular region of a plurality of independent slices.

The picture header coding unit 1200 codes common information needed in decoding all slices in an image and transmits the coded information to the slice coding unit 1300. In this case, the number, shape, position, and size of slices are included in the transmitted information.

The slice coding unit 1300 codes the image in units of slices by referring to picture header information input from the picture header coding unit 1200. For this purpose, the spatial/temporal prediction coding portion 1310 removes spatially and temporally overlapped information. The transform and quantizing portion 1320 performs predetermined transform, for example, DCT, on an output of the spatial/temporal prediction coding portion 1310 and quantizes a transform parameter. The entropy coding portion 1330 codes entropy of an output of the transform and quantizing portion 1320 and generates a compressed bitstream.

The slice coding unit 1300 divides an image in units of slices when the image is coded and transmitted via a network. In particular, the image is divided in units of rectangular slices and coded, and thus, an inter-slice prediction loss is reduced. Also, ROI coding and picture-in-picture (PIP) coding are performed using a slice structure divided into rectangular inner and outer regions. Here, in the ROI coding, the image is divided into a region of interest (ROI) and a background region, and image quality of the ROI is increased, and image quality of the background region is lowered such that subjective image quality is improved using restricted bit rate. In the PIP coding, a portion comprised of rectangular slices can be independently decoded such that the portion is used like another image.

According to the present invention, when a rectangular region comprised of a plurality of slices is overlapped on another rectangular region, a predetermined region between the overlapped portion and the background region is set as an interpolation region such that during the ROI coding operation, due to a rapid variation of image quality between the ROI and the background region, subjective image quality is prevented from being lowered. In addition, during the PIP coding operation, PIP having various sizes can be used.

Figure 12:
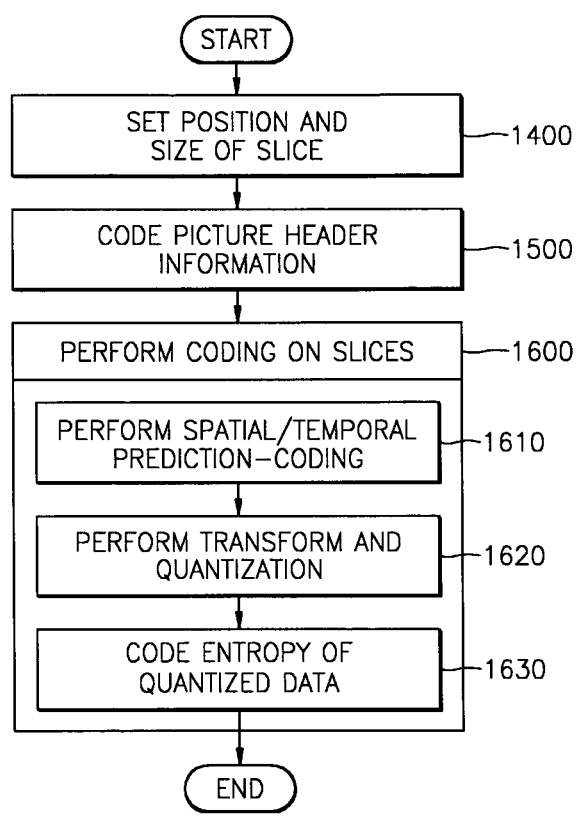
FIG. 12 shows a flowchart illustrating an image coding method performed in the image coding apparatus of FIG. 11.

FIG. 12 shows a flowchart illustrating an image coding method performed in the image coding apparatus of FIG. 11. Referring to FIG. 12, if position and size of a rectangular region to be independently processed are set, in step 1400, the slice modeling unit 1100 divides the corresponding rectangular region into at least one of independent slices. In step 1500, the picture header coding unit 1200 codes a picture header, and in step 1600, coding on slices is performed by the slice coding unit 1300.

Here, slice coding (step 1600) comprises spatial/temporal prediction coding of removing spatially and temporally overlapped information existing in an image in units of slices (step 1610), performing predetermined transform, for example, DCT, and quantization on the data from which the overlapped information is removed (step 1620), and coding entropy of the quantized data and generating a compressed bitstream (step 1630).

Figure 13:
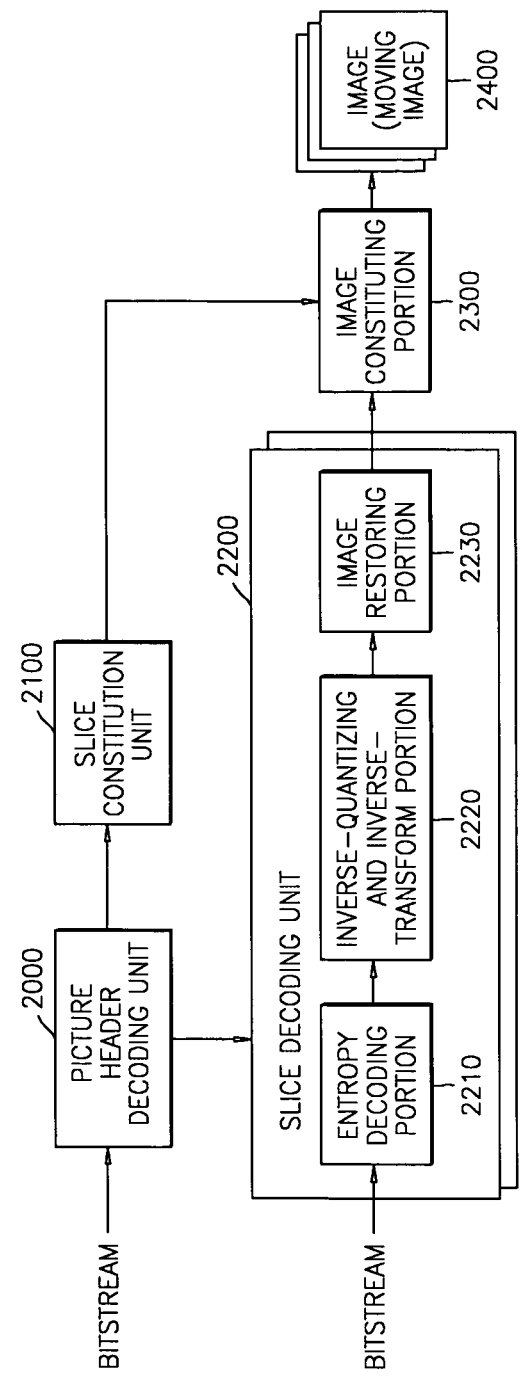
FIG. 13 shows a block diagram schematically illustrating an image decoding apparatus according to another embodiment of the present invention.

FIG. 13 shows a block diagram schematically illustrating an image decoding apparatus according to another embodiment of the present invention. Referring to FIG. 13, the image decoding apparatus according to the present invention includes a picture header decoding unit 2000, a slice constituting unit 2100, a slice decoding unit 2200, and an image constituting unit 2300. The slice decoding unit 2200 includes an entropy decoding portion 2210, an inverse-quantizing and inverse-transform portion 2220, and an image restoring portion 2230.

The picture header decoding unit 2000 decodes picture header information in a bitstream received via a network. Information on the number, shape, position, and size of slices for each decoded rectangular region is transmitted to the slice constituting unit 2100, and other information is transmitted to the slice decoding unit 2200.

The slice constituting unit 2100 selects positions of slices in response to information on the number, shape, position, and size of slices for each decoded rectangular region transmitted by the picture header decoding unit 2000, processes an overlapped portion of a rectangular region, and constitutes slices. Processing of the overlapped portion of the rectangular region will be described below with reference to FIG. 15.

The slice decoding unit 2200 decodes the image in units of slices by referring to picture header information input from the picture header decoding unit 2000. For this purpose, the entropy decoding portion 2210 decodes entropy of a bitstream, and the inverse-quantizing and inverse-transform portion 2220 performs inverse-quantization and inverse-transform on the entropy-decoded bitstream. Also, the image restoring portion 2230 compensates spatial/temporal prediction-coded information for output data of the inverse-quantizing and inverse-transform portion 2220 and restores the image. In this case, the image restored in units of slices is added to a part of an image by the image constituting unit 2300 in response to information input by the slice constituting unit 2100.

The image decoding apparatus having the above structure according to the present invention is used to decode an image coded by the image coding apparatus of FIG. 11. The operation of the image decoding apparatus is performed in a reverse order to that of the image coding apparatus. However, principle characteristics for slice processing of the image decoding apparatus are the same as those of the image coding apparatus. Thus, for convenience, these operations will not be repeated here.

Figure 14:
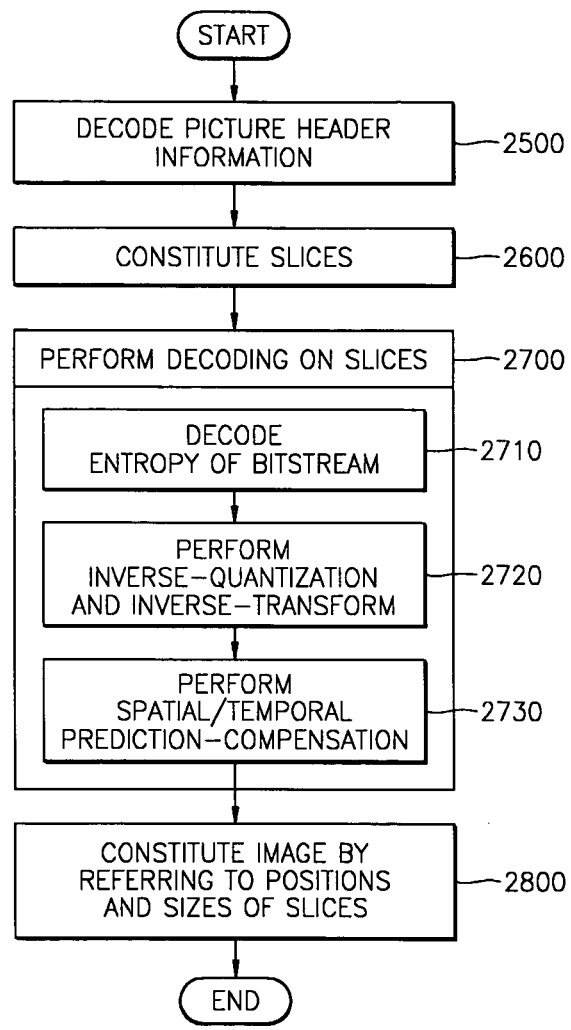
FIG. 14 shows a flowchart illustrating an image decoding method performed in the image decoding apparatus of FIG. 13.

FIG. 14 shows a flowchart illustrating an image decoding method performed in the image decoding apparatus of FIG. 13. Referring to FIG. 14, in step 2500, picture header information is decoded in a received bitstream. In this case, in step 2600, information on the number, shape, position, and size of slices for each decoded rectangular region is transmitted by the slice constituting unit 2100, and the slice constituting unit 2100 selects the positions of slices in response to the input information, processes an overlapped portion of a rectangular region, and constitutes slices. In step 2700, decoding is performed on the constituted slices, and in step 2800, an image is constituted by referred to the positions and sizes of the slices.

Here, slice decoding (step 2700) comprises decoding entropy of a bitstream (step 2710), performing inverse-quantization and inverse-transform on the entropy-decoded data (step 2720), and compensating spatial/temporal prediction-coded information for the inverse-transform performed data (step 2730).

Figure 15A:
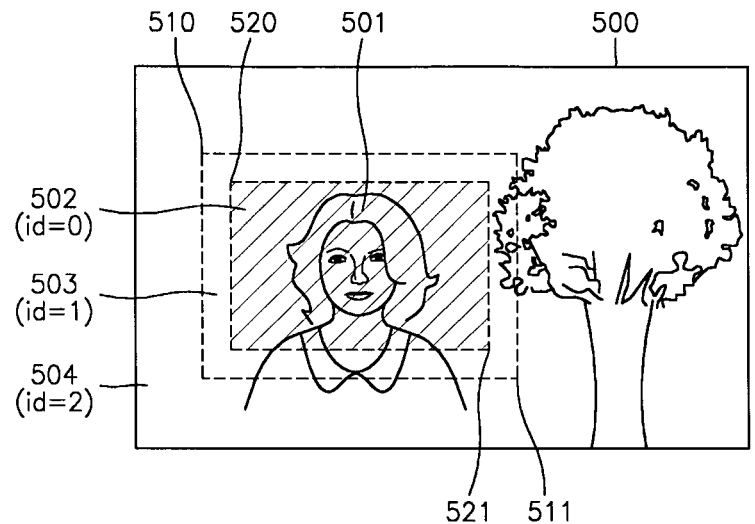
FIGS. 15A, 15B, and 15C illustrate a method of processing slices according to the present invention.
Figure 15B:
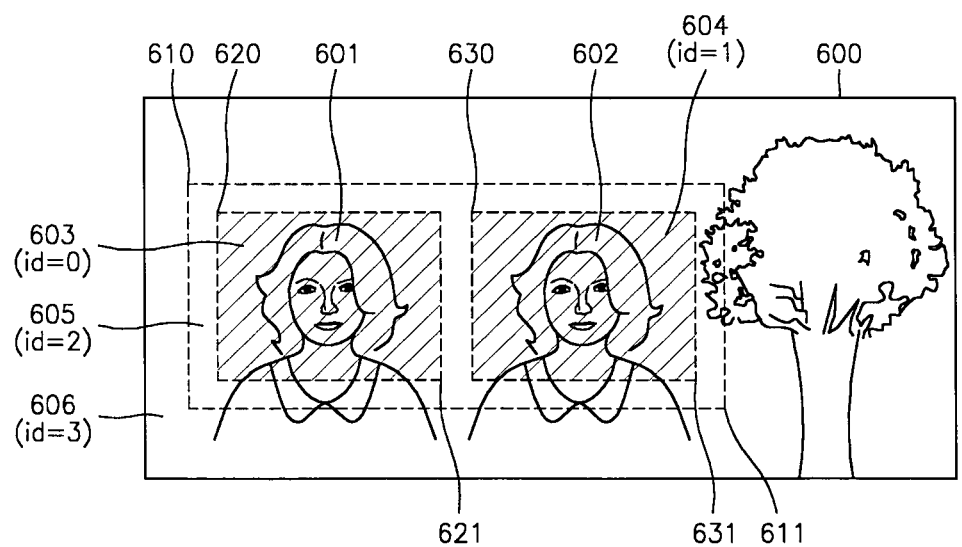
Figure 15C:
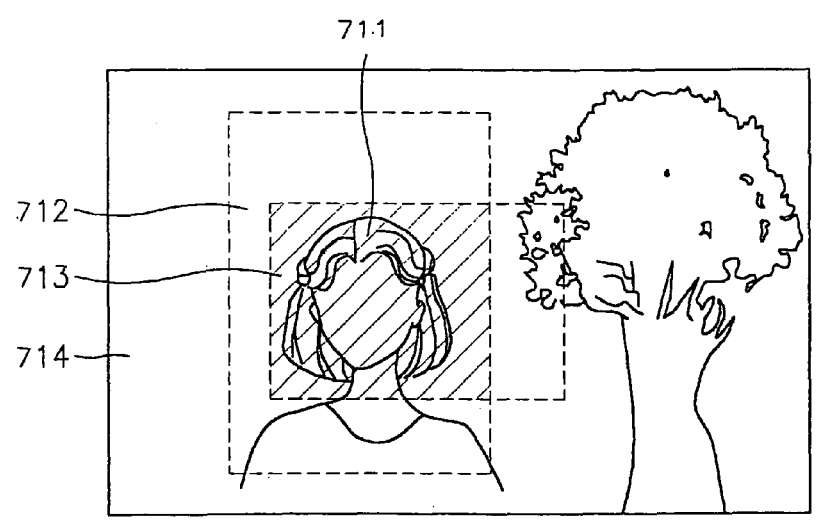

FIGS. 15A, 15B, and 15C illustrate a method of processing slices according to the present invention. Referring to FIG. 15A, a part of an image 500 includes two rectangular regions 502 and 503 and a background region 504. The two rectangular regions 502 and 503 are overlapped with each other. Also, the two rectangular regions 502 and 503 and the background region 504 are comprised of a plurality of independent slices.

The smaller rectangular region 502 of the two rectangular regions 502 and 503 is completely included in a region of the larger rectangular region 503. In this case, the larger rectangular region 503 represents a portion from which the smaller rectangular region 502 is excluded (a region in which a hatched portion is excluded from the region of the larger rectangular region 503) not to be overlapped on a region (a hatched portion) of the smaller rectangular region 502. In this case, the smaller rectangular region 502 includes a region which a user thinks more important in the piece of image 500, i.e., a region of interest (ROI), and the larger rectangular region 503 is used as an interpolation region placed between the ROI 501 and the background region 504. Here, the smaller rectangular region 502 including the ROI 501 and the larger rectangular region 503 used as the interpolation region represent information on position and size of each rectangular region using left-upper position information 520 and 510 and right-lower position information 521 and 511. As described above, the two rectangular regions 502 and 503 and the background region 504 are comprised of a plurality of independent slices and are coded and decoded in units of slices. Also, when the image shown in FIG. 15A is coded and decoded, preferably, the image is coded in the order of the smaller rectangular region 502, the larger rectangular region 503, and the background region 504, and regions can be discriminated by assigning the number of a region in accordance with the order of a coded rectangular region. For example, as shown in FIG. 15A, the number of a region id=0 may be assigned to the foremost coded rectangular region 502, and the number of a region id=1 may be assigned to the next coded rectangular region 503, and the number of a region id=2 may be assigned to the background region 504.

Likewise, an interpolation region 503 is set between the ROI 501 and the background region 504 such that occurrence of a boundary between a ROI and a background region is effectively reduced.

Here, the plurality of slices constituting the smaller rectangular region 502 can be independently decoded. Thus, when the decoding of the whole image is unnecessary, only the slices constituting the smaller rectangular region including the ROI are decoded. In this case, an image restored from the smaller rectangular region 502 becomes picture-in-picture (PIP). The image restored from the larger rectangular region 503 is added to the image restored from the smaller rectangular region 502 and constitutes another larger PIP. Thus, PIP can be stepwise constituted as the number of rectangular regions in a part of an image, that is, from a small image to a larger image can be expressed.

In FIG. 15B, a part of an image 600 includes three rectangular regions 603, 604, and 605, and a background region 606. The two rectangular regions 603 and 604 are not overlapped with each other and are overlapped on another rectangular region 605. Also, the three rectangular regions 603, 604, and 605 and the background region 606 are comprised of a plurality of independent slices.

Referring to FIG. 15B, each of the two rectangular regions 603 and 604 includes different ROIs 601 and 602 which a user thinks more important in the piece of image 600. Here, the smaller rectangular regions 603 and 604 including the ROIs 601 and 602 and the larger rectangular region 605 used as the interpolation region represent information on position and size of each rectangular region using left-upper position information 630, 620, and 610 and right-lower position information 631, 621, and 611. As described above, the three rectangular regions 603, 604, and 605 and the background region 606 are comprised of a plurality of independent slices and are coded and decoded in units of slices. Also, when the image shown in FIG. 15B is coded and decoded, preferably, the image is coded in the order of the smaller rectangular regions 603 and 604, the larger rectangular region 605, and the background region 606, and regions can be discriminated by assigning the number of a region in accordance with the order of a coded rectangular region. For example, as shown in FIG. 15B, the number of a region id=0 may be assigned to the foremost coded rectangular region 603, and the number of a region id=1 may be assigned to the next coded rectangular region 604, the number of a region id=3 may be assigned to the next coded larger rectangular region 605, and the number of a region id=4 may be assigned to the background region 606.

Likewise, an interpolation region 605 is set between the ROIs 601 and 602 and the background region 606 such that occurrence of a boundary between a ROI and a background region is effectively reduced. Briefly, FIG. 15C similarly illustrates two overlapping region of interest slices 712 and 713, having an overlapping portion 711, with a background region 714.

In this way, ROI coding or PIP coding can be effectively performed using a slice structure in which inside of a rectangular region is a ROI and outside of the rectangular region is a background region. In particular, as described above, several rectangular regions are overlapped with one another such that a boundary between regions is reduced and PIP having various sizes can be supported. In addition, slices including ROIs are coded to be more robust to errors such that a better subjective image quality is obtained in a transmission environment with errors.

Figure 16:
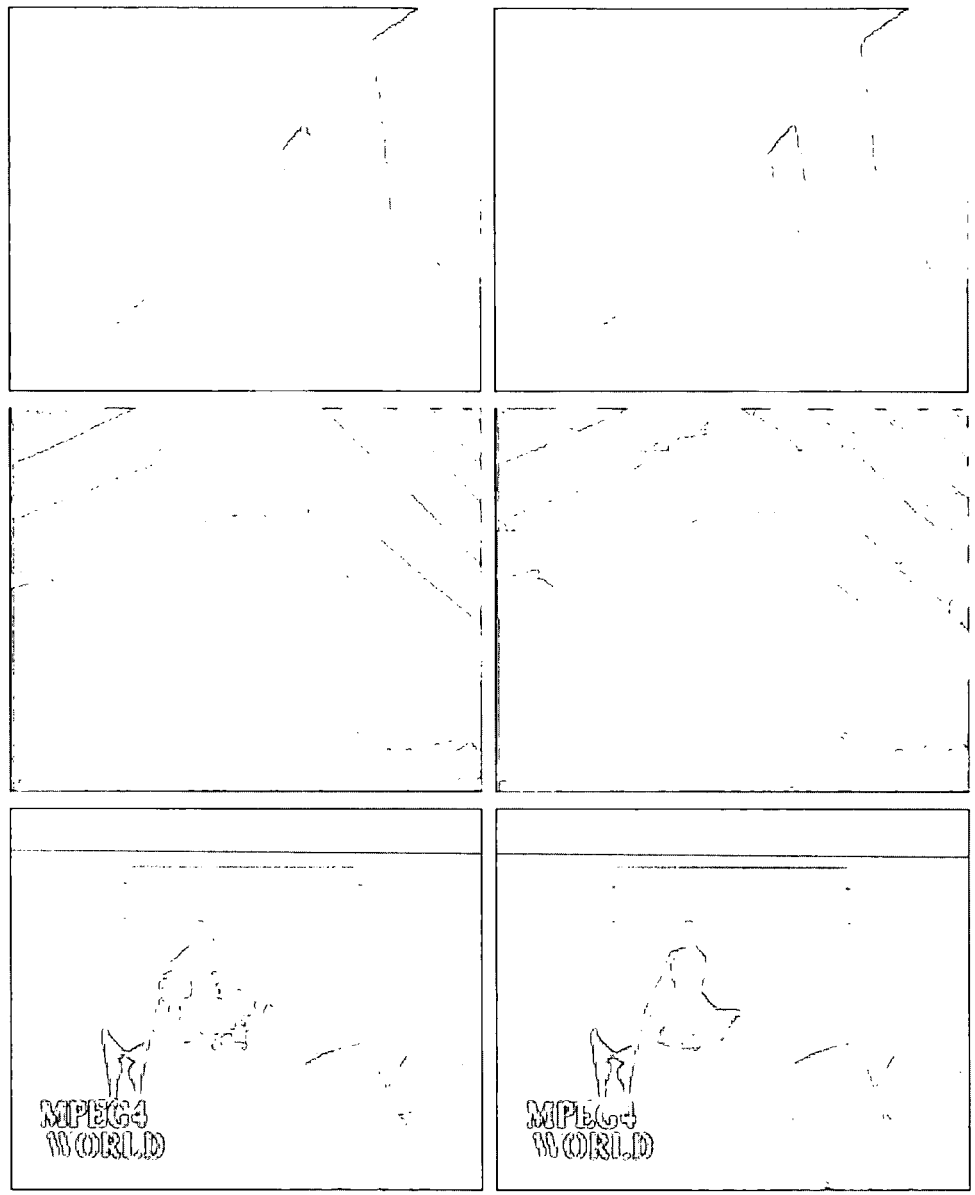
FIG. 16 shows comparison of a subjective image quality of a case where a coding method according to the present invention is applied to an actual image, with a case where a conventional coding method is applied to an actual image.

FIG. 16 shows comparison of a subjective image quality of a case where a coding method according to the present invention is applied to an actual image, with a case where a conventional coding method is applied to an actual image. Referring to FIG. 16, a left column represents subjective image quality using a conventional coding method, and a right column represents subjective image quality using the coding method according to the present invention, showing the results at a 20% packet loss ratio. In FIG. 16, it can be noted that image quality of a region of interest (ROI) is improved such that overall subjective image quality is improved. Also, the ROI is more protected from errors such that overall subjective image quality is improved.

Figure 17:
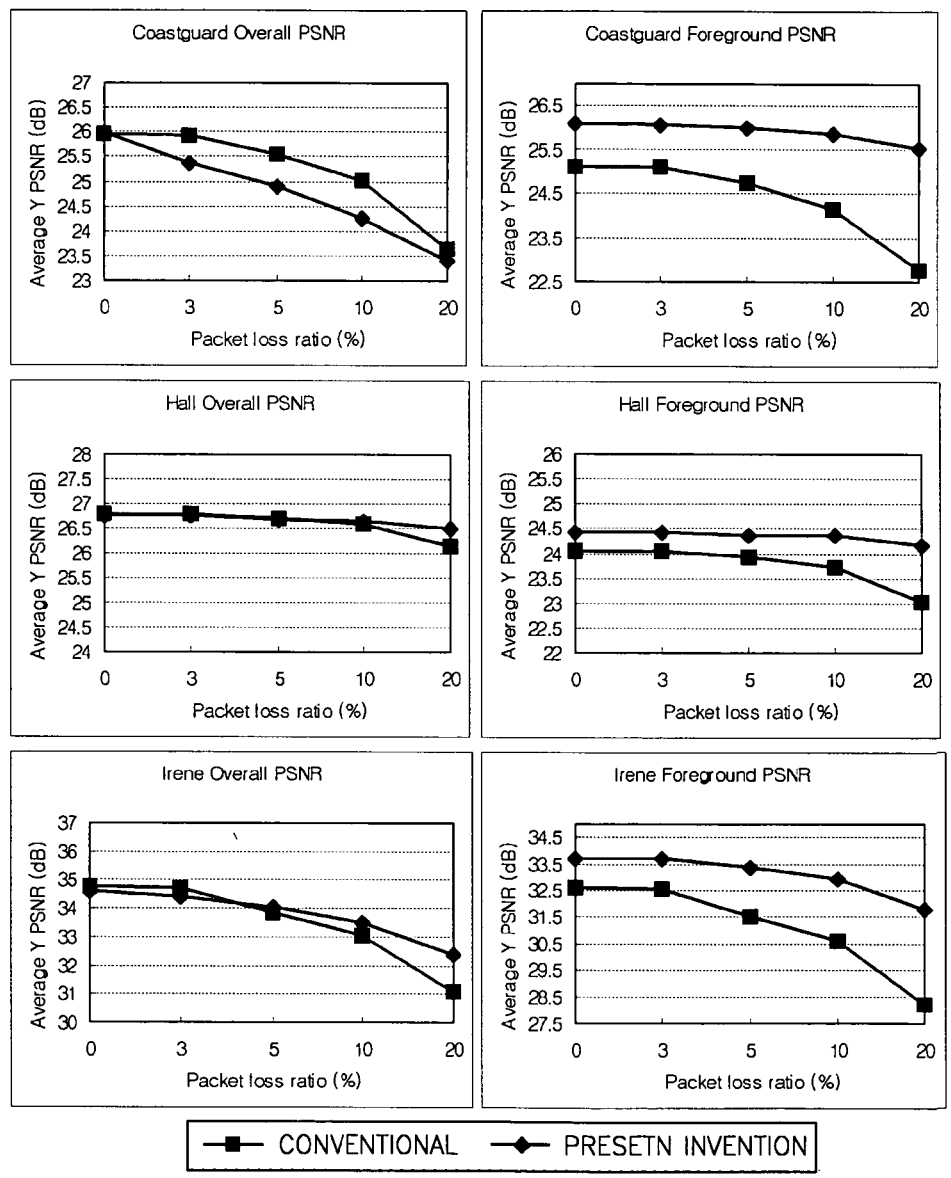
FIG. 17 shows comparison of an objective image quality of a case where a coding method according to the present invention is applied to an actual image, with a case where a conventional coding method is applied to an actual image.

FIG. 17 shows comparison of an objective image quality of a case where a coding method according to the present invention is applied to an actual image, with a case where a conventional coding method is applied to an actual image. Referring to FIG. 17, a left column represents PSNR in the whole image, and a right column represents PSNR in a region of interest (ROI). In FIG. 17, it can be noted that PSNR in the whole image and the ROI using the coding method according to the present invention is improved compared to the conventional coding method.

In addition, the present invention can be implemented as computer readable codes on computer readable recording media. The computer readable recording media include all kinds of recording apparatuses on which computer readable data is stored. The computer readable recording media include ROMs, RAMS, CD-ROMs, magnetic tapes, floppy discs, and optical data storage apparatuses. The computer readable recording media are installed in a computer system that is connected to a network, and thus the computer readable codes can be stored and executed in a distributed mode.

As described above, according to the image coding method and apparatus considering human visual characteristics of the present invention, a scene is divided into a region of interest (ROI) and a background region, and modeling of image quality distribution is performed such that a difference in the image quality between the ROI and the background region is not rapid, thereby improving image quality. In addition, ROI coding can be effectively performed using rectangular regions, each region being independently coded and decoded in units of slices. In particular, rectangular regions are overlapped with one another such that occurrence of a boundary between the ROI and the background region is effectively prevented, thereby improving subjective image quality. Further, there is no need of iteratively readjusting the quantization parameter for each region, so as to meet given amount of bit, and thus a large amount of calculation is not needed.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An image coding method comprising:
setting positions and sizes of designated slices of an image, the designated slices including at least two independent rectangular slice of at least two respective regions that partially overlap and at least one slice of a region that surrounds at least one of the at least two partially overlapping regions;
coding, using at least one processing device, respective information on positions and sizes of the designated slices to a picture header; and
coding an image in units of slices by referring to the picture header.

2. An image coding method comprising:
setting, positions and sizes of designated slices of an image, the designated slices being portions of the image designated into at least two independent rectangular slices representing at least two regions that partially overlap;
coding, using at least one processing device, information on positions and sizes of the designated slices to a picture header; and
coding an image in units of slices by referring to the picture header,
wherein, in the setting of the positions and sizes of the slices, an inner rectangular region including a region of interest is set, and an outer rectangular region surrounding the inner rectangular region is set, a region excluding the outer rectangular region is set to a background region, and the inner rectangular region, a region between the inner rectangular region and the outer rectangular region, and the background region are each designated into at least one independent slice.

3. The method as claimed in claim 2, wherein the outer rectangular region is an interpolation region interpolated so that a boundary between the inner rectangular region and the background region dose not appear.

4. The method as claimed in claim 2, wherein, in the coding of the image, a picture-in-picture (PIP) having a small size is set using slices making up the inner rectangular region, and another PIP is set using the slices making up the inner rectangular region and slices making up the region between the inner rectangular region and the outer rectangular region.

5. An image coding method comprising:
setting, positions and sizes of designated slices of an image, the designated slices being portions of the image designated into at least two independent rectangular slices representing at least two regions that partially overlap;
coding, using at least one processing device, information on positions and sizes of the designated slices to a picture header; and
coding an image in units of slices by referring to the picture header, wherein, in the setting of the positions and sizes of the designated slices, a plurality of inner rectangular regions including a plurality of regions of interest are set, and an outer rectangular region surrounding the plurality of inner rectangular regions is set, and a region excluding the outer rectangular region is set to a background region, and the plurality of inner rectangular regions, the region between the plurality of inner rectangular regions and the outer rectangular region, and the background region are each designated into at least one independent slice.

6. The method as claimed in claim 5, wherein the outer rectangular region is an interpolation region interpolated so that a boundary between the plurality of inner rectangular regions and the background region does not appear.

7. The method as claimed in claim 1, wherein the coding of the image comprises:
performing spatial/temporal prediction coding on the image in units of slices;
performing predetermined transform and quantization on a result of the performed spatial/temporal prediction-coding;
coding entropy of information a result of the performed predetermined transform and quantization.

8. A recording medium on which the image coding method as claimed in claim 1 is recorded as a program code that can be executed by a computer.

9. An image coding method in which an image is designated in units of slices having a predetermined size and is coded, the method comprising:
defining information on positions and sizes of a plurality of rectangular regions in which a region of interest is included in the image;
coding all slices included in a smallest inner rectangular region among the plurality of rectangular regions;
coding, using at least one processing device, slices of at least one outer rectangular region such that outer rectangles excluding an inner rectangular region are not overlapped on smaller inner rectangles, with the at least one outer rectangular region surrounding the inner rectangular region and the inner rectangular region including at least two overlapping regions each being designated at least one slice; and
defining a region not included in an outermost outer rectangular region as a background region and coding slices included in the background region.

10. The method as claimed in claim 9, wherein each position and size of the plurality of rectangular regions, including the at least two overlapping regions as regions of interest, are indicated by positions of left-upper edge and right-lower edge of each rectangle.

11. The method as claimed in claim 9, wherein an inherent number having a predetermined order is assigned to the plurality of rectangular regions, including the at least two overlapping regions as regions of interest, and the background region.

12. A recording medium on which the image coding method as claimed in claim 9 is recorded as a program code that can be executed by a computer.

13. An image coding method comprising:
setting an inner rectangular region including a region of interest and an outer rectangular region including the inner rectangular region, setting at least two overlapping regions within the inner rectangular region, setting a region excluding the outer rectangular region as a background region, and designating the inner rectangular region, a region between the inner rectangular region and the outer rectangular region, at least one of the two overlapping regions, and the background region each into at least one independent slice;
coding respective information on positions and sizes of the designated slices to a picture header; and
coding, using at least one processing device, an image in units of slices by referring to the coded picture header.

14. An image coding method comprising:
setting positions and sizes of slices to designate portions of an image, the slices including at least two respective slices of at least two partially overlapping regions, with the overlapping regions being regions of interest, and at least one slice of a region that surrounds at least one of the at least two partially overlapping regions;

coding respective information on positions and sizes of the slices to a picture header; and coding, using at least one processing device, an image in units of slices by referring to the picture header.

15. An image coding method comprising:

setting positions and sizes of slices to designate portions of an image, the slices including at least two partially overlapping region of interest slices;

coding information on positions and sizes of the slices to a picture header; and coding, using at least one processing device, an image in units of slices by referring to the picture header, wherein, in the setting of the positions and sizes of the slices, an inner rectangular region including a region of interest is set, and an outer rectangular region surrounding the inner rectangular region is set, a region excluding the outer rectangular region is set to a background region, and the inner rectangular region, a region between the inner rectangular region and the outer rectangular region, and the background region are designated each into at least one independent slice.

16. The method as claimed in claim 15, wherein the outer rectangular region is an interpolation region interpolated so that a boundary between the inner rectangular region and the background region dose not appear.

17. The method as claimed in claim 15, wherein, in the coding of the image, a picture-in-picture (PIP) having a small size is set using slices making up the inner rectangular region, and another PIP is set using the slices making up the inner rectangular region and slices making up the region between the inner rectangular region and the outer rectangular region.

18. An image coding method comprising:

setting positions and sizes of slices to designate portions of an image, the slices including at least two partially overlapping region of interest slices;

coding information on positions and sizes of the slices to a picture header; and coding, using at least one processing device, an image in units of slices by referring to the picture header, wherein, in the setting of the positions and sizes of the slices, a plurality of inner rectangular regions including a plurality of regions of interest are set, and an outer rectangular region surrounding the plurality of inner rectangular regions is set, and a region excluding the outer rectangular region is set to a background region, and the plurality of inner rectangular regions, the region between the plurality of inner rectangular regions and the outer rectangular region, and the background region are designated each into at least one independent slice.

19. The method as claimed in claim 18, wherein the outer rectangular region is an interpolation region interpolated so that a boundary between the plurality of inner rectangular regions and the background region does not appear.

20. The method as claimed in claim 14, wherein the coding of the image comprises:

performing spatial/temporal prediction coding on the image in units of slices;

performing predetermined transform and quantization on a result of the performed spatial/temporal prediction-coding;

coding entropy of information a result of the performed predetermined transform and quantization.

21. A recording medium on which the image coding method as claimed in claim 14 is recorded as a program code that can be executed by a computer.

22. An image coding method in which an image is designated in units of slices having a predetermined size and is coded, including at least two partially overlapping region of interest slices, the method comprising:

defining information on positions and sizes of a plurality of rectangular regions, the plurality of rectangular regions including at least two partially overlapping regions as regions of interest included in the image;

coding all slices included in a smallest inner rectangular region among the plurality of rectangular regions;

coding, using at least one processing device, slices of at least one outer rectangular region such that outer rectangles excluding an inner rectangular region are not overlapped on smaller inner rectangles, with the at least one outer rectangular region surrounding the inner rectangular region and the inner rectangular region including the at least two partially overlapping regions each being designated at least one slice; and defining a region not included in an outermost outer rectangular region as a background region and coding slices included in the background region.

23. The method as claimed in claim 22, wherein each position and size of the plurality of rectangular regions including the at least two partially overlapping regions are indicated by positions of left-upper edge and right-lower edge of each rectangle.

24. The method as claimed in claim 22, wherein an inherent number having a predetermined order is assigned to the plurality of rectangular regions including the at least two partially overlapping regions and the background region.

25. A recording medium on which the image coding method as claimed in claim 22 is recorded as a program code that can be executed by a computer.

26. An image coding method comprising:

setting an inner rectangular region including at least two regions of interest and an outer rectangular region including the inner rectangular region, setting a region excluding the outer rectangular region to a background region, and designating the inner rectangular region, a region between the inner rectangular region and the outer rectangular region, and the background region each into at least one independent slice, with at least one of the inner rectangular region, the region between the inner rectangular region and the outer rectangular region, and the background region being designated at least two independent slices and including at least two partially overlapping regions, as regions of interest;

coding respective information on positions and sizes of the designated slices to a picture header; and coding, using at least one processing device, an image in units of slices by referring to the coded picture header.

27. An image coding method comprising:

setting positions and sizes of slices in a part of an image;

coding respective information on positions and sizes of the slices to a picture header; and coding, using at least one processing device, an image in sequential units of slices by referring to the picture header such that each coding of slices includes subtracting data of respective slices from image data corresponding to a plurality of slices to remove overlapped image data from coding, wherein the slices include at least respective slices of an inner region and an outer region surrounding the inner region.

28. The method as claimed in claim 27, wherein data corresponding to two partially overlapping slices is coded only for one of the overlapping slices based on the sequential coding of the image.

29. An image coding method comprising:
setting positions and sizes of slices in a part of an image;
coding information on positions and sizes of the slices to a picture header; and
coding, using at least one processing device, an image in sequential units of slices by referring to the picture header such that each coding of slices includes subtracting data of respective slices from image data corresponding to a plurality of slices to remove overlapped image data from coding,
wherein in the setting of the positions and sizes of the slices, an inner rectangular region including a region of interest is set, and an outer rectangular region surrounding the inner rectangular region is set, a region excluding the outer rectangular region is set to a background region, and the inner rectangular region, a region between the inner rectangular region and the outer rectangular region, and the background region are designated each into at least one independent slice.

30. The method as claimed in claim 29, wherein the outer rectangular region is an interpolation region interpolated so that a boundary between the inner rectangular region and the background region dose not appear.

31. The method as claimed in claim 29, wherein in the coding of the image, a picture-in-picture (PIP) having a small size is set using slices making up the inner rectangular region, and another PIP is set using the slices making up the inner rectangular region and slices making up the region between the inner rectangular region and the outer rectangular region.

32. An image coding method comprising:
setting positions and sizes of slices in a part of an image;
coding information on positions and sizes of the slices to a picture header; and
coding, using at least one processing device, an image in sequential units of slices by referring to the picture header such that each coding of slices includes subtracting data of respective slices from image data corresponding to a plurality of slices to remove overlapped image data from coding,
wherein, in the setting of the positions and sizes of the slices, a plurality of inner rectangular regions including a plurality of regions of interest are set, and an outer rectangular region surrounding the plurality of inner rectangular regions is set, and a region excluding the outer rectangular region is set to a background region, and the plurality of inner rectangular regions, the region between the plurality of inner rectangular regions and the outer rectangular region, and the background region are designated each into at least one independent slice.

33. The method as claimed in claim 32, wherein the outer rectangular region is an interpolation region interpolated so that a boundary between the plurality of inner rectangular regions and the background region does not appear.

34. The method as claimed in claim 27, wherein the coding of the image comprises:
performing spatial/temporal prediction coding on the image in units of slices;
performing predetermined transform and quantization on a result of the performed spatial/temporal prediction-coding; and
coding entropy of a result of the performed predetermined transform and quantization.

35. A recording medium on which the image coding method as claimed in claim 27 is recorded as a program code that can be executed by a computer.

36. An image coding method in which an image is designated in units of slices having a predetermined size and is coded, the method comprising:
defining information on positions and sizes of a plurality of rectangular regions in which a region of interest is included in the image
coding all slices included in a smallest inner rectangular region first among the plurality of rectangular regions;
coding, using at least one processing device, slices of at least one outer rectangular region such that outer rectangles excluding an inner rectangular region are not overlapped on smaller inner rectangles, with the at least one outer rectangular region surrounding the inner rectangular region and the inner rectangular region being designated at least one slice; and
defining a region not included in an outermost outer rectangular region as a background region and coding slices included in the background region,
wherein each coding of slices includes subtracting data of respective slices from image data corresponding to a plurality of slices to remove overlapped image data from coding.

37. The method as claimed in claim 36, wherein each position and size of the plurality of rectangular regions including the region of interest are indicated by positions of left-upper edge and right-lower edge of each rectangle.

38. The method as claimed in claim 36, wherein an inherent number having a predetermined order is assigned to the plurality of rectangular regions including the region of interest and the background region.

39. A recording medium on which the image coding method as claimed in claim 36 is recorded as a program code that can be executed by a computer.

40. An image coding method comprising:
setting an inner rectangular region including a region of interest and an outer rectangular region surrounding the inner rectangular region, setting a region excluding the outer rectangular region to a background region, and designating the inner rectangular region, a region between the inner rectangular region and the outer rectangular region, and the background region each into at least one independent slice of an image;
coding respective information on positions and sizes of the designated slices to a picture header; and
sequentially coding, using at least one processing device, an image in units of slices by referring to the coded picture header such that each coding of slices includes subtracting data of respective slices from image data corresponding to a plurality of slices to remove overlapped image data from coding.

41. The method as claimed in claim 40, wherein data corresponding to two partially overlapping slices is coded only for one of the overlapping slices based on the sequential coding of the image.

42. An image coding method comprising:
setting positions and sizes of slices in a part of an image;
coding respective information on positions and sizes of the slices to a picture header; and
coding, using at least one processing device, an image in sequential units of slices by referring to the picture header such that each coding of slices includes subtracting data of respective slices from image data corresponding to a plurality of slices to remove overlapped image data from being coded in plural slices.

43. The method as claimed in claim 42, wherein in the setting of the positions and sizes of the slices, an inner rectangular region including a region of interest is set, and an outer rectangular region surrounding the inner rectangular region is set, a region excluding the outer rectangular region is set to a background region, and the inner rectangular region, a region between the inner rectangular region and the outer rectangular region, and the background region are designated each into at least one independent slice.

44. The method as claimed in claim 42, wherein, in the setting of the positions and sizes of the slices, a plurality of inner rectangular regions including a plurality of regions of interest are set, and an outer rectangular region surrounding the plurality of inner rectangular regions is set, and a region excluding the outer rectangular region is set to a background region, and the plurality of inner rectangular regions, the region between the plurality of inner rectangular regions and the outer rectangular region, and the background region are designated each into at least one independent slice.

45. An image coding method comprising:
setting positions and sizes of slices in a part of an image;
coding respective information on positions and sizes of the slices to a picture header; and
coding, using at least one processing device, an image in sequential units of slices by referring to the picture header such that each coding of slices includes subtracting data of respective slices from image data corresponding to a plurality of slices to remove overlapped image data from coding,
wherein overlapping data corresponding to two partially overlapping slices is coded only for one of the two partially overlapping slices based on the sequential coding of the image.

46. The method as claimed in claim 45, wherein in the setting of the positions and sizes of the slices, an inner rectangular region including a region of interest is set, and an outer rectangular region surrounding the inner rectangular region is set, a region excluding the outer rectangular region is set to a background region, and the inner rectangular region, a region between the inner rectangular region and the outer rectangular region, and the background region are designated each into at least one independent slice.

47. The method as claimed in claim 45, wherein, in the setting of the positions and sizes of the slices, a plurality of inner rectangular regions including a plurality of regions of interest are set, and an outer rectangular region surrounding the plurality of inner rectangular regions is set, and a region excluding the outer rectangular region is set to a background region, and the plurality of inner rectangular regions, the region between the plurality of inner rectangular regions and the outer rectangular region, and the background region are designated each into at least one independent slice.

48. An image coding method in which an image is designated in units of slices having a predetermined size and is coded, the method comprising:
defining information on positions and sizes of a plurality of rectangular regions in which a region of interest is included in the image
coding all slices included in a smallest inner rectangular region first among the plurality of rectangular regions;
coding, using at least one processing device, slices in which outer rectangles excluding the inner rectangular region are not overlapped on smaller inner rectangles; and
defining a region not included in an outermost outer rectangular region as a background region and coding slices included in the background region,
wherein each coding of slices includes subtracting data of respective slices from image data corresponding to a plurality of slices to remove overlapped image data from being coded in plural slices.

49. An image coding method comprising:
setting an inner rectangular region including a region of interest and an outer rectangular region including the inner rectangular region, setting a region excluding the outer rectangular region to a background region, and designating the inner rectangular region, a region between the inner rectangular region and the outer rectangular region, and the background region into at least one of independent slices of an image;
coding respective information on positions and sizes of the designated slices to a picture header; and
sequentially coding, using at least one processing device, an image in units of slices by referring to the coded picture header such that each coding of slices includes subtracting data of respective slices from image data corresponding to a plurality of slices to remove overlapped image data from being coded in plural slices.

50. An image coding method comprising:
setting an inner rectangular region including a region of interest and an outer rectangular region including the inner rectangular region, setting a region excluding the outer rectangular region to a background region, and designating the inner rectangular region, a region between the inner rectangular region and the outer rectangular region, and the background region into at least one of independent slices of an image;
coding respective information on positions and sizes of the designated slices to a picture header; and
sequentially coding, using at least one processing device, an image in units of slices by referring to the coded picture header such that each coding of slices includes subtracting data of respective slices from image data corresponding to a plurality of slices to remove overlapped image data from coding,
wherein overlapping data corresponding to two partially overlapping slices is coded only for one of the two partially overlapping slices based on the sequential coding of the image.

* * * * *

UNITED STATES PATENT AND TRADEMARK OFFICE
CERTIFICATE OF CORRECTION

PATENT NO.        : 8,599,930 B2  
APPLICATION NO.   : 11/304701  
DATED             : December 3, 2013  
INVENTOR(S)       : Woo-shik Kim et al.

Page 1 of 1

It is certified that error appears in the above-identified patent and that said Letters Patent is hereby corrected as shown below:

In the Claims

Column 15, Line 40, In Claim 3, delete "dose" and insert -- does --, therefor.
Column 17, Line 29, In Claim 16, delete "dose" and insert -- does --, therefor.
Column 19, Line 28, In Claim 30, delete "dose" and insert -- does --, therefor.

Signed and Sealed this
Twenty-fifth Day of March, 2014

Michelle K. Lee
*Deputy Director of the United States Patent and Trademark Office*